United States Patent [19]

Suzuki et al.

[11] 4,382,798

[45] May 10, 1983

[54] ANTI-SOILING TREATING AGENT

[75] Inventors: Yasuyuki Suzuki, Izumi-ohtsu; Tadashi Ito, Osaka, both of Japan

[73] Assignee: Dainippon Inc. & Chemicals Inc., Tokyo, Japan

[21] Appl. No.: 291,451

[22] Filed: Aug. 10, 1981

[30] Foreign Application Priority Data

Aug. 13, 1980 [JP] Japan ............................... 55/110384

[51] Int. Cl.[3] ........................ C08K 5/16; C08L 27/12; C14C 11/00; D06M 9/00

[52] U.S. Cl. .................................. 8/94.1 R; 8/115.6; 252/8.57; 252/8.6; 428/423.4; 428/425.1; 428/425.8; 524/96; 524/168; 524/169; 524/197; 524/200

[58] Field of Search ................ 524/96, 168, 169, 197, 524/200; 560/157; 252/8.6, 8.57; 8/94.1 R, 115.6; 428/423.4, 425.1, 425.8

[56] References Cited

U.S. PATENT DOCUMENTS

| | | | |
|---|---|---|---|
| 3,920,389 | 11/1975 | Eanzel | 252/8.6 |
| 3,940,435 | 2/1976 | Hiestand | 252/8.7 |
| 3,965,074 | 6/1976 | Middleton | 252/8.6 |
| 3,968,066 | 6/1976 | Mueller | 524/96 |
| 4,060,681 | 11/1977 | Kleiner et al. | 252/8.6 |
| 4,264,484 | 4/1981 | Patel | 8/115.6 |

*Primary Examiner*—Allan Lieberman
*Attorney, Agent, or Firm*—Sherman & Shalloway

[57] ABSTRACT

An anti-soiling treating agent comprising (a) a perfluoroalkyl-containing hybrid urethane compound (I) resulting from the addition reaction of two perfluoroalkyl-containing alcohols which have a difference in melting point of at least 20° C. and are selected from compounds of the following formula Rf—A—B—OH wherein Rf represents a linear or branched perfluoroalkyl group, A is the group $-(CH_2)_l-$ in which l is an integer of 0 to 5, the group

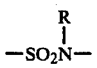

in which R is a hydrogen atom, an alkyl group having not more than 12 carbon atoms or a substituted alkyl group, the group

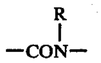

in which R is as defined above, a phenylene group, an ether linkage, or an ester linkage, and B represents an alkylene or aralkylene group having not more than 12 carbon atoms, or a derivative thereof containing an ether linkage, the mole ratio between the two alcohols being 33–67:-67–33, with a polyisocyanate, or (b) a composition comprising the perfluoroalkyl-containing hybrid urethane compound (I) and a fluorine-free vinyl polymer (II) having a Rockwell hardness of 90 to 130, or (c) a composition comprising the perfluoroalkyl-containing hybrid urethane compound (I) and a perfluoroalkyl-containing vinyl polymer (III), or (d) a composition comprising the perfluoroalkyl-containing hybrid urethane compound (I), the perfluoroalkyl-containing vinyl polymer (III) and the fluorine-free vinyl polymer (II), and if desired, water and/or an organic solvent.

23 Claims, No Drawings

ANTI-SOILING TREATING AGENT

This invention relates to a novel and useful anti-soiling agent consisting mainly of a hybrid urethane compound having a perfluoroalkyl group.

In recent years, investigations have been undertaken about various perfluoroalkyl group-containing compounds for use as anti-soiling treating agents which protect the surfaces of textile articles (e.g., carpets, wall cloths, etc.), paper products (e.g., wall paper), plastic articles, natural and artificial leathers, metallic articles, etc. from liquid soiling substances or solid dirts and dusts. As treating agents having superior anti-soiling properties and durability (in the case of carpets for example, durability to walking), anti-soiling treating agents consisting mainly of a certain kind of urethane compound containing a perfluoroalkyl group have been proposed.

So long as conventional urethane compounds are used in these treating agents, the applicability of such treating agents to various articles, which frequently troubles manufacturers concerned with finishing treatment using such treating agents, has not proved to be entirely satisfactory.

For example, in applying anti-soiling treating agents to carpets, it is the usual practice to spray such agents in the form of an emulsion by means of a spray gun, etc. The emulsion should therefore have a high level of stability which will ensure uniformity of the treating operation and of finishing. Despite this, the perfluoroalkyl-containing urethane compounds are generally difficult to emulsify and the preparation of a highly stable emulsion from these compounds is difficult. For example, conventional homogeneous urethane compounds obtained by the addition of one kind of perfluoroalkyl-containing alcohol to a polyisocyanate compound, above all those which give anti-soiling resistance and durability above the desired levels, have relatively high melting points and are very difficult to dissolve in solvents. Hence, they are difficult to emulsify, and even when they can be emulsified, the resulting emulsion is unstable. Consequently, the emulsion particles agglomerate and settle during storage, and the sprayability of the emulsion is reduced. When such a treating agent is to be applied to spread carpets for maintenance purposes, drying in an oven cannot be used and the treated carpets must be dried at room temperature. A whitening phenomenon therefore tends to occur on the surface of the carpets, and their finished appearance is markedly impaired. Some of conventional homogeneous urethane compounds have low melting points or are easily soluble in solvents so that they can be very easily emulsified. Such compounds, however, do not give treated articles having durability to walking, stamping, etc. which is intended inherently by anti-soiling treating agents.

There are known urethane compounds of another type which have been improved so as to be easily emulsified and have a high level of stability in the form of an emulsion. These urethane compounds are called hybrid urethane compounds resulting from the addition of a perfluoroalkyl-containing alcohol and a hydrocarbon-type alcohol to a polyisocyanate compound. In fact, such hybrid urethane compounds are favorable to emulsification because of their increased solvent-solubility. On the other hand, because of their hydrocarbon affinity increased by the introduction of the hydrocarbon-type alcohol, their resistance to oily soiling substances is sacrificed.

It is an object of this invention to remove the defects of the aforesaid conventional anti-soiling treating agents.

We have now found that specified hybrid urethanes having perfluoroalkyl groups can give a solution to the aforesaid various problems, and are effective as anti-soiling treating agents for textile articles such as carpets; and that when used in combination with a specified polymer, there hybrid urethanes are equally effective.

Thus, according to this invention, there is provided an anti-soiling treating agent comprising (a) a perfluoroalkyl-containing hybrid urethane compound (I) resulting from the addition reaction of two perfluoroalkyl-containing alcohols which have a difference in melting point of at least 20° C. and are selected from compounds of the following formula $$Rf—A—B—OH \qquad (1)$$

wherein Rf represents a linear or branched perfluoroalkyl group preferably having 4 to 16 carbon atoms, A is the group $-(CH_2)_l-$ in which l is an integer of 0 to 5, the group $$-SO_2\overset{R}{\overset{|}{N}}-$$

in which R is a hydrogen atom, an alkyl group having not more than 12 carbon atoms or a substituted alkyl group, the group $$-CO\overset{R}{\overset{|}{N}}-$$

in which R is as defined, a phenylene group, an ether linkage, or an ester linkage, and B represents an alkylene or aralkylene group having not more than 12 carbon atoms, or a derivative thereof containing an ether linkage, the mole ratio between the two alcohols being 33–67:67–33 with a polyisocyanate, or (b) a composition comprising the perfluoroalkyl-containing hybrid urethane compound (I) and a fluorine-free vinyl polymer (II) having a Rockwell hardness of 90 to 130, in which the weight ratio of (I) to (II) is preferably from 1:10 to 10:1, more preferably from 1:5 to 5:1, or (c) a composition comprising the perfluoroalkyl-containing hybrid urethane compound (I) and a perfluoroalkyl-containing vinyl polymer (III) in which the weight ratio of (I) to (III) is preferably from B 1:10 to 10:1, more preferably from 1:5 to 5:1, or (d) a composition comprising the perfluoroalkyl-containing hybrid urethane compound (I), the perfluoroalkyl-containing vinyl polymer (III) and the fluorine-free vinyl polymer (II), in which preferably the weight ratio of (I) to (III) is from 1:10 to 10:1 and the weight ratio of (I)+(III) to (II) is from 1:10 to 10:1, and more preferably the weight ratio of (I) to (III) is from 1:5 to 5:1 and the weight ratio of (I)+(III) to (II) is from 1:5 to 5:1.

Two compounds having a melting point difference of at least 20° C. between them are selected from the compounds of general formula (1) in this invention. The use of such two perfluoroalkyl-containing alcohols is essential in obtaining an anti-soiling agent of good performance. Preferred is a hybrid urethane compound (I) prepared by using a perfluoroalkyl-containing alcohol having a melting point of at least 70° C. and another perfluoroalkyl-containing alcohol having a melting point at least 20° C. lower than the melting point of the first-mentioned alcohol. Furthermore, it is desirable to use such a combination of two perfluoroalkyl-containing alcohols as can give a urethane compound having a melting point in the range of 20° to 150° C. As stated above, the two perfluoroalkyl-containing alcohols are used in proportions of 33–67 mole% and 67–33 mole%, respectively.

Typical examples of the perfluoroalkyl-containing alcohols are given below.

$CF_3(CF_2)_7SO_2N(CH_3)CH_2CH_2OH$, $CF_3(CF_2)_3SO_2N(CH_3)CH(CH_3)CH_2OH$, $CF_3(CF_2)_3SO_2N(CH_2CH_3)CH_2CH_2OH$, $CF_3(CF_2)_3SO_2N(CH_3)CH_2CH(CH_3)OH$, $CF_3(CF_2)_7SO_2N(CH_2CH_3)CH_2CH_2OH$, $CF_3(CF_2)_9SO_2N(CH_2CH_2CH_3)CH_2CH_2OH$, $CF_3(CF_2)_7SO_2N(CH_2CH_2CH_3)CH_2CH_2OH$, $CF_3(CF_2)_7SO_2N(CH_2CH_3)(CH_2)_6OH$, $CF_3(CF_2)_7SO_2N(CH_2CH_3)(CH_2)_{11}OH$, $CF_3(CF_2)_7SO_2N(C_4H_9)(CH_2)_2OH$, $CF_3(CF_2)_7SO_2N(CH_3)(CH_2)_4OH$,

$CF_3(CF_2)_7SO_2N(C_3H_7)CH_2OCH_2CH_2CH_2OH$,

$CF_3(CF_2)_6CON(C_2H_5)CH_2CH_2OH$, $C_{10}F_{21}CH_2CH_2OH$, and $C_{12}F_{25}CH_2CH_2OH$.

Examples of the polyisocyanate include aromatic polyisocyanates such as 2,4-tolylene diisocyanate, 2,6-tolylene diisocyanate, 4,4'-diphenylmethane diisocyanate, tolylene diisocyanate, crude MDI, and a trimethylolpropane/tolylene adduct; alicyclic polyisocyanates such as isophorone diisocyanate and hydrogenated MDI; and aliphatic polyisocyanates such as hexamethylene diisocyanate and lysine diisocyanate. Preferred polyisocyanates are di- or tri-isocyanates. In order to increase the durability of the anti-soiling property of the treating agent, it is preferable to use those polyisocyanates which contain at least one aliphatic or aromatic ring per molecule.

A first feature of the urethane compound (I) as a main ingredient of the treating agent of this invention is that the alcohol compounds to be reacted with the polyisocyanates are limited to those containing perfluoroalkyl groups, and are not alcohol compounds of the hydrocarbon type. Another feature is that it is a so-called "hybrid urethane" obtained by using two perfluoroalkyl-containing alcohols having a melting point difference of at least 20° C. in proportions of 33–67 mole% and 67–33 mole% respectively.

The urethane compound having such a limited structure may be obtained by any desired methods which can give it with good efficiency. Preferably, it is prepared by a method which comprises reacting a perfluoroalkyl-containing alcohol having a lower melting point with an excess of the polyisocyanate to form an adduct, and reacting it with a perfluoroalkyl-containing alcohol having a higher melting point. When 2,4-tolylene diisocyanate is used as the polyisocyanate, the addition reaction may be performed in two stages by utilizing a difference in reactivity between the isocyanate groups.

The hybrid urethane compound (I) in accordance with the addition reaction of these perfluoroalkyl-containing alcohols and the polyisocyanate can be obtained by reacting both components in a ratio of the alcohol equivalent to the isocyanate equivalent of from 1:1.2 to 1.2:1 at a temperature of 50° to 150° C. in the presence or absence of an organic solvent in a substantially anhydrous condition.

If desired, up to 34% by weight of the hybrid urethane compound may be substituted by a homogeneous urethane compound in which all of the urethane linkages per molecule are based on only one kind of perfluoroalkyl-containing alcohol.

The resulting perfluoroalkyl-containing hybrid urethane compound (I) so obtained may be used as an anti-soiling treating agent in its as-obtained form, or in combination with the fluorine-free vinyl polymer (II) and/or the perfluoroalkyl-containing vinyl polymer (III) as described below.

The fluorine-free vinyl polymer (II) should have a Rockwell hardness ($\alpha$), determined by ASTM D-785, of 90 to 130, preferably 100 to 120. If the hardness ($\alpha$) of the fluorine-free vinyl polymer (II) is less than 90 or more than 130, the resulting composition is not moderately hard, and stains adhere thereto under pressure. Moreover, it is difficult to retain its durability.

Examples of the fluorine-free vinyl polymer (II) are homopolymers of fluorine-free vinyl monomers capable of forming hard polymers, such as styrene, vinyl chloride and methyl methacrylate, copolymers derived from these monomers, and copolymers derived from these monomers and not more than 10% by weight of another vinyl monomer. Polystyrene having a hardness ($\alpha$) of 99, hard polyvinyl chloride having a hardness ($\alpha$) of 105 and poly (methyl methacrylate) having a hardness ($\alpha$) of 111 are typical examples.

Examples of the fluorine-free vinyl monomers include ethylene, propylene, butylene, butadiene, isoprene, chloroprene, vinylidene chloride, vinyl acetate, an ester of acrylic or methacrylic acid with an alcohol having not more than 20 carbon atoms, an amide of acrylic or methacrylic acid with an alkylamine having not more than 20 carbon atoms, diacetone acrylamide, N-methylol acrylamide, acrylonitrile, acrylamide, and vinyl compounds having a siloxane bond.

The perfluoroalkyl-containing vinyl polymer (III) is obtained by homopolymerizing or copolmerizing vinyl monomers having perfluoroalkyl groups or copolymerizing these vinyl monomers with fluorine-free vinyl monomers. It is represented by the following formula

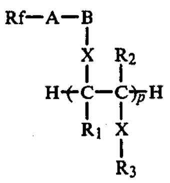

(2)

Rf, A and B are as defined with regard to formula (1), X represents a divalent bonding group such as

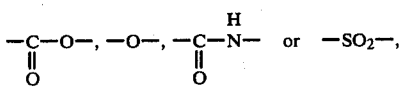

$R_1$ and $R_2$ represent a hydrogen atom or an alkyl group having not more than 2 carbon atoms, $R_3$ represents Rf—A—B— or an alkyl group having not more than 8 carbon atoms, and p is 5 to 100 and represents the number of recurring monomeric units;

or the following general formula

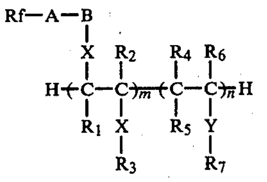

(3)

wherein Rf, A and B are as defined with regard to general formula (1), X represents a divalent bonding groups such as

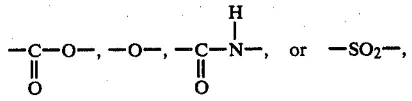

$R_1$ and $R_2$ represents a hydrogen atom or an alkyl group having not more than 2 carbon atoms, $R_3$ represents Rf—A—B or an alkyl group having not more than 8 carbon atoms, $R_4$, $R_5$ and $R_6$ represent a hydrogen atom, an alkyl group having not more than 8 carbon atoms, or a halogen atom other than fluorine, Y represents a divalent bonding group such as an ester, ether or acid amide group of a direct bond between $R_7$ and a carbon atom in the main chain, $R_7$ represents a hydrogen atom, a nitrile group, or an alkyl, alkenyl or aryl group having not more than 20 carbon atoms, and m and n each represent a number of 5 to 100 which shows that number of recurring monomeric units, provided that m and n are selected such that the weight ratio of the two monomers to be copolymerized is in the the range of from 3:97 to 90:10.

Typical examples of the perfluoroalkyl-containing vinyl monomer include the following.

$C_7F_{15}CH_2OCOCH{=}CH_2$, $C_8F_{17}SO_2(C_3H_7)CH_2CH_2OCOCH{=}CH_2$, $C_8F_{17}SO_2(CH_3)CH_2CH_2OCOC(CH_3){=}CH_2$,

-continued

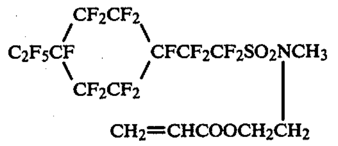

$C_7F_{15}CON(C_2H_5)CH_2CH_2OCOC(CH_3){=}CH_2$, $CF_3(CF_2)_5CH_2CH_2OCOCH{=}CH_2$, $CF_3(CF_2)_9CH_2CH_2OCH{=}CH_2$, $C_8F_{17}(CH_2)_{11}OCOC(CH_3){=}CH$,

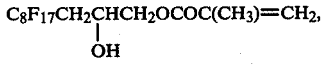

$(CF_3)_2CFO(CH_2)_5OCOCH{=}CH_2$,

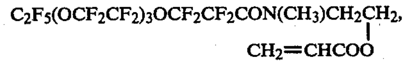

$C_8F_{17}SO_2N(CH_2CH_2OCOCH\ CH_2)$, $C_8F_{17}SO_2N(CH_3)(CH_2)_{10}OCOCH_2CH{=}CH_2$, $C_8F_{17}SO_2N(C_2H_5)CH_2CH_2OCOCH{=}CHCOOC_4H_9$, $C_8F_{13}SO_2N(CH_3)CH_2CH_2OCOCH{=}CH_2$, and $C_8F_{17}SO_2NHCH_2CH_2SO_2CH{=}CH_2$.

The fluorine-free vinyl monomer to be copolymerized with the perfluoroalkyl-containing vinyl monomer may be any of those exemplified hereinabove as monomers for production of the fluorine-free vinyl polymer (II).

As stated above, the ratio of the perfluoroalkyl-containing vinyl monomer and the fluorine-free vinyl monomer to be copolymerized is from 3:97 to 90:10 by weight.

The fluorine-free vinyl polymer (II) and the perfluoroalkyl-containing vinyl polymer (III) are usually obtained in bulk, solution, suspension or emulsion.

The polymer (II) or (III) is mixed with the perfluoroalkyl-containing hybrid urethane compound (I) in a weight ratio of from 1:10 to 10:1 to form a composition (b) or (c), respectively. In order not to reduce durability, anti-soiling property, water repellency and oil repellency, the weight ratio of the urethane compound (I) to the polymer (II) or (III) is preferably from 1:5 to 5:1.

The composition (d) consisting of three polymers (I), (II) and (III) is formed by mixing the three polymers such that the weight ratio of (I) to (III) is in the range of from 1:10 to 10:1 and the weight ratio of (I)+(III) to (II) is in the range of from 1:10 to 10:1. In order not to reduce durability, anti-soiling property, water repellency and oil repellency, the weight ratio of (I) to (III) is preferably from 1:5 to 5:1, and the weight ratio of (I)+(III) to (II) is preferably from 1:5 to 5:1.

It is not fully known why the perfluoroalkyl-containing hybrid urethane compound as a main ingredient of the composition of this invention exhibits not only excellent anti-soiling property but also durability to walking, stamping, etc. and water and oil repelling properties. However, this is presumably for the following reason. The hybrid urethane can be easily emulsified because it has a lower melting point than homogeneous urethane compounds and possesses improved miscibility with emulsifiers. In addition, the hybrid urethane in accordance with this invention becomes moderately soft to such an extent as not to reduce its durability and covers the surface of textile materials.

It is neither known why a composition comprising the urethane compound and the perfluoroalkyl-containing vinyl polymer and/or the fluorine-free vinyl polymer exhibits the same outstanding effects. It is theorized however that the composition consisting of the urethane compound and the fluorine-free vinyl polymer has resistance to soil adhesion because it is hard, and based on the affinity between the urethane compound and the perfluoroalkyl-containing vinyl polymer, one of them becomes a well anti-soiling extender for the other.

The anti-soiling treating agent of the invention can be applied to a material to be treated in the form of an emulsion by a sprayer. If desired, it may be used in the form of a solution in an organic solvent.

The anti-soiling treating agent of this invention usually has a solids content of 0.001 to 70%.

The anti-soiling treating agent of the invention may contain an antistatic agent or softening agent in order to prevent accumulation of static charge on a human body during walking or improve the hand of the pile portion of a carpet surface. The treating agent in accordance with this invention can impart excellent soiling resistance to the surfaces of textile articles (e.g., carpets and wall cloths), paper products (e.g., wall papers), plastic articles, natural or artificial leather products, metallic articles, etc.

The articles treated with the treating agent of this invention are forcibly or spontaneously dried in a hot air oven and then used in practical applications.

The following examples illustrate the present invention more specifically.

EXAMPLE 1

A 500 ml four-necked flask equipped with a thermometer, a cooling tube and a vacuum stirrer and set on an oil bath was charged with 117 g of N-n-propylperfluorooctanesulfonamide ethanol (melting point 55° C.) and 263 g of fully dehydrated methyl isobutyl ketone, and the air inside the flask was replaced by dry nitrogen. Then, 34.8 g of 2,4-tolylene diisocyanate was added to the resulting solution, and the mixture was heated to 80° C. The mixture was stirred for 4 hours, and then 114 g of N-methylperfluorooctanesulfonamide ethanol (melting point 110° C.) was added. The mixture was stirred at the same temperature for 4 hours to give a perfluoroalkyl-containing hybrid urethane.

After the reaction, 526 g of water containing 13 g of a fluorine-containing aliphatic emulsifier was added, and the mixture was processed on a homogenizer at 75° C. under a pressure of 2,500 psi to give a stable emulsion.

The emulsion so obtained was spray-coated on a nylon loop pile carpet, and dried at 130° C. for 20 minutes.

The solids content of the emulsion was 2% based on the weight of the surface pile portion of the carpet.

The results including the anti-soiling property of the above treating agent are shown in Table 1.

EXAMPLES 2 TO 5

The same procedure as in Example 1 was repeated using the raw materials shown in Table 2. Thus, various emulsions containing perfluoroalkyl-containing hybrid urethanes were obtained.

Carpets were treated in the same way as in Example 1 using each of these emulsions.

The results are shown in Table 1.

EXAMPLE 6

Water (398.4 g) and 1.2 g of laurylmethyl ammonium chloride were introduced into a flask equipped with a stirrer, and nitrogen gas was passed through the flask for 1 hour to expel oxygen.

Then, a dropping funnel was attached to the flask, and a mixture of 10 g of $C_8F_{17}SO_2N(CH_3)C_2H_4OCOCH{=}CH_2$ and 90 g of methyl methacrylate was introduced into the dropping funnel. The dropping funnel was similarly purged with nitrogen.

The temperature of the solution in the flask was then adjusted to 70° C., and a 10% aqueous solution of 0.4 g of 2,2'-azobis(2-amidinopropane)hydrochloride was added. Subsequently, the above polymerizable monomeric mixture was added dropwise over about one hour. Throughout this procedure, the temperature was maintained at about 70° C. by external cooling.

After the addition, the mixture was stirred at the same temperature for 4 hours to give a perfluoroalkyl-containing vinyl polymer (III) (abbreviated "polymer P-1").

Then, the polymer P-1 and the hybrid urethane obtained in Example 1 were mixed in a weight ratio of 2:1 to give a composition.

The composition was applied to a carpet in the same way as in Example 1, and tested. The results are shown in Table 1.

EXAMPLE 7

The hybrid urethane prepared in Example 2 and the polymer P-1 obtained in Example 6 were mixed in a weight ratio of 1:2 to give a composition. The composition was tested, and the results are shown in Table 1.

EXAMPLE 8

The hybrid urethane obtained in Example 3 and the polymer P-1 obtained in Example 6 were mixed in a weight ratio of 1:2 to give a composition. The composition was tested, and the results are shown in Table 1.

EXAMPLE 9

A composition was prepared in the same way as in Example 7 except that the hybrid urethane obtained in Example 4 was used instead of the hybrid urethane used in Example 7. The composition was tested, and the results are shown in Table 1.

EXAMPLE 10

A composition was prepared in the same way as in Example 7 except that the hybrid urethane obtained in Example 5 was used instead of the hybrid urethane used in Example 2. The composition was tested, and the results are shown in Table 1.

EXAMPLE 11

The same procedure as in Example 6 was repeated except that $C_8F_{17}SO_2N(CH_3)C_2H_4OCOCH{=}CH_2$ was not used and 100 g of methyl methacrylate was used. A methyl methacrylate homopolymer as the fluorine-free vinyl polymer (II) was obtained (to be abbreviated "polymer P-2").

A composition was prepared in the same way as in Example 6 except that the polymer P-1 was replaced by the polymer P-2. The composition was applied to a carpet in the same way as in Example 1, and tested. The results are shown in Table 1.

EXAMPLE 12

A composition was prepared in the same way as in Example 11 except that the hybrid urethane obtained in Example 1 was used instead of the hybrid urethane used in Example 11. The composition was tested, and the results are shown in Table 1.

EXAMPLE 13

A styrene homopolymer as the fluorine-free vinyl polymer was prepared by repeating the procedure of Example 11 except that styrene was used instead of methyl methacrylate.

A composition was prepared in the same way as in Example 6 except that the styrene homopolymer obtained was used instead of the polymer P-1.

The composition was applied to a carpet in the same way as in Example 1, and tested. The results are shown in Table 1.

EXAMPLE 14

A hard vinyl chloride polymer as the fluorine-free vinyl polymer (II) was prepared by repeating the procedure of Example 11 except that vinyl chloride was used instead of methyl methacrylate.

The vinyl chloride polymer and the hybrid urethane obtained in Example 1 were mixed in a weight ratio of 2:1 to give a composition.

The composition was applied to a carpet in the same way as in Example 1, and tested. The results are shown in Table 1.

EXAMPLE 15

A flask equipped with a stirrer was charged with 398.4 g of water and 1.2 g of laurylmethyl ammonium chloride, and nitrogen gas was passed through the flask for 1 hour to expel oxygen.

A dropping funnel was then attached to the flask, and a mixture of 70 g of $C_8F_{17}SO_2N(CH_3)C_2H_4OCOCH{=}CH_2$ and 30 g of 2-ethylhexyl methacrylate was introduced into the dropping funnel. The funnel was similarly purged with nitrogen.

Then, the temperature of the solution in the flask was adjusted to 70° C., and a 10% aqueous solution of 0.4 g of 2,2′-azobis(2-amidinopropane) hydrochloride was added. The above polymerizable monomeric mixture was then added dropwise over about 1 hour. During this procedure, the temperature was maintained at about 70° C. by external cooling.

After the addition, the mixture was stirred at the same temperature for 4 hours to give a perfluoroalkyl-containing vinyl polymer.

Sixty-five parts by weight of the resulting vinyl polymer was mixed with 35 parts by weight of the perfluoroalkyl-containing hybrid urethane obtained in Example, and then 200 parts of the polymer P-2 obtained in Example 11 was added. Thus, an emulsion containing these polymers was prepared.

The emulsion was sprayed on artificial leather of suede touch obtained by wet-impregnation of a nonwoven fabric of polyester with polyurethane to a solids content of 0.5% by weight based on the weight of the artificial leather, and then dried at 120° C. for 5 minutes.

The anti-soiling properties of the treated artificial leather are shown in Table 3.

EXAMPLE 16

A polypropylene loop pile carpet was spray-treated with the composition obtained in Example 15 to a solids concentration of 0.75% by weight based on the weight of the pile, and dried at 120° C. for 5 minutes.

The anti-soiling properties of the treated carpet are shown in Table 3.

COMPARATIVE EXAMPLES 1 TO 3

Three types of urethane emulsions were obtained by repeating the procedure of Example 1 except that each of the recipes shown in Table 2 were used.

Each of the emulsions was applied to a carpet in the same way as in Example 1, and tested. The results are shown in Table 1.

The urethane compounds or compositions containing them which are obtained in the above Examples and Comparative Examples were tested for water repellency (AQ test), oil repellency and dry soiling resistance.

In the water repellency test, a small liquid droplet composed of a mixture of isopropanol and water in a weight ratio of 20:80 was placed gently on a carpet, and observed to determine whether the treated carpet absorbed the liquid droplet.

In the oil repellency test, several drops of each of the test liquids shown in Table 4 were placed on two parts of the surface of the treated carpet. The state of penetration of the liquid droplets was observed 30 seconds later, and evaluated (AATCC-118-1975).

In the dry soiling resistance test, a soiling test was carried out by using the dry stain (having the composition shown in Table 5) shown in JIS L-1021-1979, and evaluated in accordance with the standards shown in Table 6.

TABLE 1

| | | Water repellency (AQ test) | Oil repellency | Dry soiling resistance |
|---|---|---|---|---|
| Example | 1 | Acceptable | 5 | 5 |
| | 2 | " | 5 | 5 |
| | 3 | " | 5 | 5 |
| | 4 | " | 4 | 5 |
| | 5 | " | 4 | 4 |
| | 6 | " | 6 | 6 |
| | 7 | " | 6 | 6 |
| | 8 | " | 6 | 6 |
| | 9 | " | 5 | 5 |
| | 10 | " | 5 | 5 |
| | 11 | " | 6 | 5 |
| | 12 | " | 6 | 5 |
| | 13 | " | 6 | 5 |
| | 14 | " | 6 | 5 |
| Comparative Example | 1 | Rejected | 3 | 1 |
| | 2 | " | 3 | 1 |
| | 3 | " | 5 | 2 |

Note:
Treatment of the carpets was carried out by the method shown in Example 1.

TABLE 2

| | Perfluoroalkyl-containing alcohol and hydrocarbon type alcohol | | | |
|---|---|---|---|---|
| | A | B | Mole ratio B/A | Polyisocyanate |
| Example 2 | ① | ③ | 1/1 | Isophorone diisocyanate |
| Example 3 | ② | ③ | 1/1 | 2,4-Tolylene diisocyanate |

TABLE 2-continued

| | Perfluoroalkyl-containing alcohol and hydrocarbon type alcohol A | B | Mole ratio B/A | Polyisocyanate |
|---|---|---|---|---|
| Example 4 | ① | ④ | 1/1 | " |
| Example 5 | ① | ③ | 1/1 | Crude MDI |
| Comparative Example 1 | ① | ⑤ | 1/1 | 2,4-Tolylene diisocyanate |
| Example 2 | ① | ⑥ | 1/1 | " |
| Example 3 | ③ | ③ | 1/1 | " |

Note:
①$CF_3(CF_2)_7SO_2N(CH_3)CH_2CH_2OH$
②$CF_3(CF_2)_8SO_2N(CH_2CH_3)CH_2CH_2OH$
③$CF_3(CH_2)_7SO_2N(CH_2CH_2CH_3)CH_2CH_2OH$
④$CF_3(CF_2)_7SO_2N(C_4H_9)CH_2CH_2OH$
⑤$HOCH_2CH_2OCH_2CH_2OCH_3$
⑥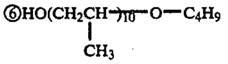

TABLE 3

| | Water repellency | Oil repellency | Dry soiling resistance |
|---|---|---|---|
| Example 15 | Acceptable | 5 | +6 |
| Untreated suede-like artificial leather | Rejected | 0 | 0 |
| Example 16 | Acceptable | 5 | +4 |
| Untreated carpet | Rejected | 0 | −2 |

TABLE 4

| Oil repellency | Test liquid |
|---|---|
| 8 | n-heptane |
| 7 | n-octane |
| 6 | n-decane |
| 5 | n-dodecane |
| 4 | n-tetradecane |
| 3 | n-hexadecane |
| 2 | a mixture of n-hexadecane and nujol (35:65 by weight) |
| 1 | nujol |
| 0 | liquids having an oil repellency of below 1 |

TABLE 5

| Component | Weight (g) |
|---|---|
| Peat moss | 38 |
| Cement | 17 |
| Potter's earth | 17 |
| Silica | 17 |
| Soot | 1.75 |
| Rust | 0.5 |
| Mineral oil | 8.75 |
| Total | 100.00 |

TABLE 6

| Standards of evaluation | Significance |
|---|---|
| −8 | The carpet is completely black with the soil. |
| 0 | The amount of the soil which the untreated carpet retained during the testing. |
| +2 | fairly good soiling resistance |
| +4 | good soiling resistance |
| +6 | excellent soiling resistance |

TABLE 6-continued

| Standards of evaluation | Significance |
|---|---|
| +8 | not soiled at all |

What we claim is:

1. An anti-soiling treating agent having a solids content of 0.001 to 70% comprising (a) a perfluoroalkyl-containing hybrid urethane compound (I) resulting from the addition reaction of two perfluoroalkyl-containing alcohols which have a difference in melting point of at least 20° C. and are selected from compounds of the following formula Rf—A—B—OH wherein Rf represents a linear or branched perfluoroalkyl group, A is the group $-(CH_2)_l-$ in which l is an integer of 0 to 5, the group

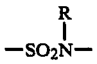

in which R is a hydrogen atom, an alkyl group having not more than 12 carbon atoms or a substituted alkyl group, the group

in which R is as defined above, a phenylene group, an ether linkage, or an ester linkage, and B represents an alkylene or aralkylene group having not more than 12 carbon atoms, or a derivative thereof containing an ether linkage, the mole ratio between the two alcohols being 33-67:67-33, with a polyisocyanate, said addition reaction being carried out at a temperature of 50° to 150° C. in the presence or absence of an orgainic solvent in an anhydrous condition while maintaining the equivalent ratio of the alcohol to the isocyanate at from 1:1.2 to 1.2:1, or (b) a composition comprising the perfluoroalkyl-containing hybrid urethane compound (I) and a fluorine-free vinyl polymer (II) having a Rockwell hardness of 90 to 130, the weight ratio of (I) to (II) being in the range of from 1:10 to 10:1, or (c) a composition comprising the perfluoroalkyl-containing hybrid urethane compound (I) and a perfluoroalkyl-containing vinyl polymer (III), said perfluoroalkyl-containing vinyl polymer (III) being represented by the general formula

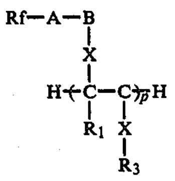

(III-1)

wherein Rf, A and B are as defined above, X represents a divalent bonding group such as

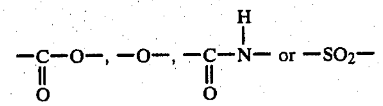

$R_1$ and $R_2$ represent a hydrogen atom or an alkyl group having not more than 2 carbon atoms, $R_3$ represents Rf—A—B— or an alkyl group having not more than 8 carbon atoms, and p is a number of 5 to 100 which shows the number of recurring monomeric units, or being represented by the general formula

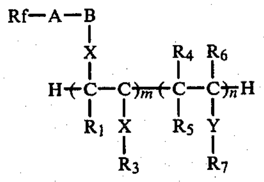

(III-2)

wherein Rf, A, B, X, and $R_3$ are as defined above, $R_4$, $R_5$ and $R_6$ each represents a hydrogen atom, an alkyl group having not more than 8 carbon atoms, or a halogen atom other than fluorine, Y represents a divalent bonding group such as an ester, ether or an acid amide group or a direct bond between $R_7$ and a carbon atom in the main chain, $R_7$ represents a hydrogen atom, a halogen atom other than fluorine, a nitrile group, or an alkyl, alkenyl or aryl group having not more than 20 carbon atoms, and m and n independently represent a number of 5 to 100 which shows the number of recurring monomeric units, provided that m and n are selected such that the ratio of the two monomers to be copolymerized is in the range of from 3:97 to 90:10, wherein the weight ratio of the hybrid urethane compound (I) to the perfluoroalkyl-containing vinyl polymer (III) is in the range of from 1:10 to 10:1 or (d) a composition comprising the perfluoroalkyl-containing hybrid urethane compound (I), the perfluoroalkyl-containing vinyl polymer (III) and the fluorine-free vinyl polymer (II), wherein the weight ratio of the hybrid urethane compound (I) to the perfluoroalkyl-containing vinyl polymer (III) is in the range of from 1:10 to 10:1, and the weight ratio of the sum of (I) and (III) to the fluorine-free vinyl polymer (II) is in the range of from 1:10 to 10:1, and if desired, water and/or an organic solvent.

2. The treating agent of claim 1 wherein the perfluoroalkyl group represented by Rf has 4 to 16 carbon atoms.

3. The treating agent of claim 1 wherein one of the perfluoroalkyl-containing alcohols has a melting point of at least 70° C., and the other has a melting point at least 20° C. lower than the melting point of the first-mentioned alcohol.

4. The treating agent of claim 1 wherein the hybrid urethane compound (I) has a melting point of 20° to 150° C.

5. The treating agent of claim 1 wherein the weight ratio of the hybrid urethane compound (I) to the fluorine-free vinyl polymer (II) is in the range of from 1:5 to 5:1.

6. The treating agent of claim 1 wherein the anti-soiling treating agent comprises (a) the perfluoroalkyl-containing hybrid urethane compound (I).

7. The treating agent of claim 1 wherein the anti-soiling treating agent comprises (b) the perfluoroalkyl-containing hybrid urethane compound (I) and the fluorine-free vinyl polymer (II).

8. The treating agent of claim 1 wherein the anti-soiling treating agent comprises (c) the perfluoroalkyl-containing hybrid urethane compound (I) and the perfluoroalkyl-containing vinyl polymer (III).

9. The treating agent of claim 8 wherein the weight ratio of the hybrid urethane compound (I) to the perfluoroalkyl-containing vinyl polymer (III) is in the range of from 1:5 to 5:1.

10. The treating agent of claim 8 wherein the perfluoroalkyl-containing vinyl polymer (III) is a polymer of formula (III-1).

11. The treating agent of claim 8 wherein the perfluoroalkyl-containing vinyl polymer (III) is a polymer of formula (III-2).

12. The treating agent of claim 1 wherein the anti-soiling treating agent comprises (d) the perfluoroalkyl-containing hybrid urethane compound (I), the fluorine-free vinyl polymer (II) and the perfluoroalkyl-containing vinyl polymer (III).

13. The treating agent of claim 1 wherein the two perfluoroalkyl-containing alcohols are compounds selected from the group consisting of:

$CF_3(CF_2)_8SO_2N(CH_2CH_3)CH_2CH_2OH$ $CF_3(CF_2)_7SO_2N(CH_3)CH_2CH_2OH$, $CF_3(CF_2)_3SO_2N(CH_3)CH(CH_3)CH_2OH$, $CF_3(CF_2)_3SO_2N(CH_2CH_3)CH_2CH_2OH$, $CF_3(CF_2)_3SO_2N(CH_3)CH_2CH(CH_3)OH$, $CF_3(CF_2)_7SO_2N(CH_2CH_3)CH_2CH_2OH$, $CF_3(CF_2)_9SO_2N(CH_2CH_2CH_3)CH_2CH_2OH$, $CF_3(CF_2)_7SO_2N(CH_2CH_2CH_3)CH_2CH_2OH$, $CF_3(CF_2)_7SO_2N(CH_2CH_3)(CH_2)_6OH$, $CF_3(CF_2)_7SO_2N(CH_2CH_3)(CH_2)_{11}OH$, $CF_3(CF_2)_7SO_2N(C_4H_9)(CH_2)_2OH$, $CF_3(CF_2)_7SO_2N(CH_3)(CH_2)_4OH$,

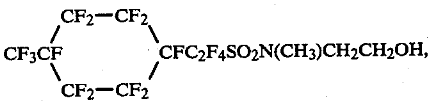

$CF_3(CF_2)_7SO_2N(C_3H_7)CH_2OCH_2CH_2CH_2OH$,

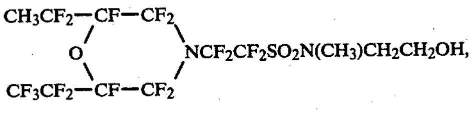

$CF_3(CF_2)_6CON(C_2H_5)CH_2CH_2OH$, $C_{10}F_{21}CH_2CH_2OH$, and $C_{12}F_{25}CH_2CH_2OH$.

14. The treating agent of claim 8 or claim 12 wherein the perfluoroalkyl-containing vinyl polymer (III) is a polymer of a monomer selected from the group consisting of:

$C_7F_{15}CH_2OCOCH{=}CH_2$, $C_8F_{17}SO_2(C_3H_7)CH_2CH_2OCOCH{=}CH_2$, $C_8F_{17}SO_2(CH_3)CH_2CH_2OCOC(CH_3){=}CH_2$,

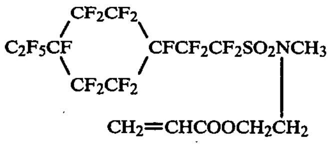

$C_7F_{15}CON(C_2H_5)CH_2CH_2OCOC(CH_3){=}CH_2$, $CF_3(CF_2)_5CH_2CH_2OCOCH{=}CH_2$, $CF_3(CF_2)_9CH_2CH_2OCH{=}CH_2$, $C_8F_{17}(CH_2)_{11}OCOC(CH_3){=}CH$,

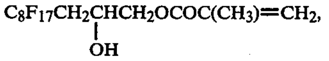

$(CF_3)_2CFO(CH_2)_5OCOCH{=}CH_2$,

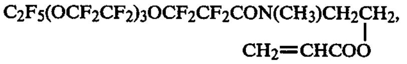

$C_8F_{17}SO_2N(CH_2CH_2OCOCH\ CH_2)$, $C_8F_{17}SO_2N(CH_3)(CH_2)_{10}OCOCH_2CH{=}CH_2$,

-continued $C_8F_{17}SO_2N(C_2H_5)CH_2CH_2OCOCH{=}CHCOOC_4H_9$, $C_8F_{13}SO_2N(CH_3)CH_2CH_2OCOCH{=}CH_2$, and $C_8F_{17}SO_2NHCH_2CH_2SO_2CH{=}CH_2$.

15. The treating agent of claim 12 wherein the weight ratio of the hybrid urethane compound (I) to the perfluoroalkyl-containing vinyl polymer (III) is in the range of from 1:5 to 5:1, and the weight ratio of the sum of (I) and (III) and the fluorine-free vinyl polymer (II) is in the range of from 1:5 to 5:1.

16. The treating agent of claim 1 wherein the polyisocyanate is an aromatic polyisocyanate, an alicyclic polyisocyanate or an aliphatic polyisocyanate.

17. The treating agent of claim 7 or 12 wherein the fluorine-free vinyl polymer (II) has a Rockwell hardness of 100 to 120.

18. The treating agent of claim 7 or 12 wherein the fluorine-free vinyl polymer (II) is polystyrene, hard polyvinyl chloride, or poly(methyl methacrylate).

19. A textile article treated with the treating agent of claim 1.

20. A paper product treated with the treating agent of claim 1.

21. A plastic article treated with the treating agent of claim 1.

22. A leather article treated with the treating agent of claim 1.

23. A metallic article treated with the treating agent of claim 1.

* * * * *